United States Patent
Tang et al.

(10) Patent No.: US 10,394,493 B2
(45) Date of Patent: Aug. 27, 2019

(54) MANAGING SHINGLED MAGNETIC RECORDING (SMR) ZONES IN A HYBRID STORAGE DEVICE

(71) Applicant: Seagate Technology LLC, Cupertino, CA (US)

(72) Inventors: Alex Tang, Cupertino, CA (US); Leonid Baryudin, San Jose, CA (US); Michael Scott Hicken, Rochester, MN (US); Mark Ish, Sandy Springs, GA (US); Carl Forhan, Rochester, MN (US)

(73) Assignee: Seagate Technology LLC, Cupertino, CA (US)

( * ) Notice: Subject to any disclaimer, the term of this patent is extended or adjusted under 35 U.S.C. 154(b) by 49 days.

(21) Appl. No.: 15/638,632

(22) Filed: Jun. 30, 2017

(65) Prior Publication Data

US 2019/0004739 A1   Jan. 3, 2019

(51) Int. Cl.
*G06F 12/00* (2006.01)
*G06F 3/06* (2006.01)
*G06F 12/02* (2006.01)
*G11B 5/012* (2006.01)

(52) U.S. Cl.
CPC .......... *G06F 3/0685* (2013.01); *G06F 3/0605* (2013.01); *G06F 3/0608* (2013.01); *G06F 3/0652* (2013.01); *G06F 3/0679* (2013.01); *G06F 3/0689* (2013.01); *G06F 12/0246* (2013.01); *G11B 5/012* (2013.01); *G06F 2212/214* (2013.01); *G06F 2212/217* (2013.01)

(58) Field of Classification Search
CPC .... G06F 3/0685; G06F 3/0605; G06F 3/0679; G06F 3/0652; G06F 3/0608; G06F 3/0689; G06F 2212/214; G06F 2212/217; G11B 5/012
See application file for complete search history.

(56) References Cited

U.S. PATENT DOCUMENTS

| | | |
|---|---|---|
| 7,965,465 B2 | 6/2011 | Sanvido et al. |
| 8,341,339 B1 | 12/2012 | Boyle et al. |
| 8,417,904 B2 | 4/2013 | Goss et al. |
| 8,639,872 B1 | 1/2014 | Boyle et al. |

(Continued)

FOREIGN PATENT DOCUMENTS

WO    2016086819 A1    6/2016

*Primary Examiner* — Kalpit Parikh
(74) *Attorney, Agent, or Firm* — Hall Estill Attorneys at Law

(57) ABSTRACT

Apparatus and method for managing data in a hybrid data storage device. The device has a first non-volatile memory (NVM) of solid state memory cells arranged into a first set of garbage collection units (GCUs), and a second NVM as a rotatable data recording medium arranged into a second set of GCUs each comprising a plurality of shingled magnetic recording tracks. A control circuit combines a first group of logical block units (LBUs) stored in the first set of GCUs with a second group of LBUs stored in the second set of GCUs to form a combined group of LBUs arranged in sequential order by logical address. The control circuit streams the combined group of LBUs to a zone of shingled magnetic recording tracks in a selected one of the second set of GCUs. A combined media translation map identifies physical addresses in both the first and second NVMs.

20 Claims, 7 Drawing Sheets

(56) References Cited

U.S. PATENT DOCUMENTS

| | | |
|---|---|---|
| 8,661,194 B2 | 2/2014 | Nam |
| 8,687,303 B2 | 4/2014 | Hall |
| 8,879,183 B1* | 11/2014 | Weikal .................. G11B 5/09 360/48 |
| 9,009,393 B1 | 4/2015 | Sutardja |
| 9,058,280 B1 | 6/2015 | Boyle et al. |
| 9,129,652 B1 | 9/2015 | Pantel |
| 9,268,499 B1 | 2/2016 | Wilkins et al. |
| 9,330,715 B1 | 5/2016 | Lee |
| 9,431,056 B2 | 8/2016 | Pantel |
| 9,438,426 B2 | 9/2016 | Li et al. |
| 2005/0251617 A1* | 11/2005 | Sinclair ................. G06F 3/061 711/103 |
| 2010/0088459 A1 | 4/2010 | Arya et al. |
| 2014/0207996 A1 | 7/2014 | Fisher et al. |
| 2014/0281183 A1* | 9/2014 | Edgar ................ G06F 12/0692 711/104 |
| 2016/0239380 A1 | 8/2016 | Wideman et al. |

* cited by examiner

MANAGING SHINGLED MAGNETIC RECORDING (SMR) ZONES IN A HYBRID STORAGE DEVICE

SUMMARY

Various embodiments of the present disclosure are generally directed to managing data in a multiple tier storage system, such as a hybrid data storage device.

In some embodiments, a hybrid storage device has a first non-volatile memory (NVM) of solid state memory cells arranged into a first set of garbage collection units (GCUs), and a second NVM as a rotatable data recording medium arranged into a second set of GCUs each comprising a plurality of shingled magnetic recording tracks. A control circuit combines a first group of logical block units (LBUs) stored in the first set of GCUs with a second group of LBUs stored in the second set of GCUs to form a combined group of LBUs arranged in sequential order by logical address. The control circuit streams the combined group of LBUs to a zone of shingled magnetic recording tracks in a selected one of the second set of GCUs.

In further embodiments, a hybrid storage device has a NAND flash memory array adapted to store logical block units (LBUs) of user data supplied by a host device in erasure blocks. The erasure blocks are arranged into a first set of garbage collection units (GCUs) each configured to be allocated and garbage collected as a unit. A rotatable magnetic recording medium is adapted to store LBUs of user data supplied by the host device in concentric data tracks. The data tracks are configured as a plurality of adjacent zones of shingled magnetic recording (SMR) tracks. The zones of SMR tracks are, in turn, arranged into a second set of GCUs each configured to be allocated and garbage collected as a unit. Each zone of SMR tracks has a succession of tracks where each successively written track partially overlaps a previously written track in the zone. A map is stored as a data structure in a memory that correlates logical addresses of the LBUs to physical addresses in the respective first and second sets of GCUs at which the LBUs are stored. The map is arranged as a combined media transition layer that uses a common format to identify physical addresses in both the NAND flash memory array and the rotatable magnetic recording medium. A control circuit is adapted to use the map to assemble and stream a group of LBUs to a selected zone of SMR tracks in a selected one of the second set of GCUs responsive to a flag bit value in the map.

In still further embodiments, a method includes programming a first set of logical block units (LBUs) to a first non-volatile memory (NVM) comprising solid state memory cells arranged into a first set of garbage collection units (GCUs) each comprising a plurality of erasure blocks that are allocated and garbage collected as a unit. A second set of LBUs is written to a second NVM comprising a rotatable data recording medium arranged into a second set of GCUs each comprising a plurality of shingled magnetic recording tracks that are allocated and garbage collected as a unit. A first group of the first set of LBUs and a second group of the second set of LBUs are combined to form a combined group of LBUs. The combined group is streamed to a zone of shingled magnetic recording tracks in a selected one of the second set of GCUs.

These and other features and aspects of various embodiments of the present disclosure can be understood upon a review of the following detailed description in conjunction with the associated drawings.

DETAILED DESCRIPTION

Figure 1:
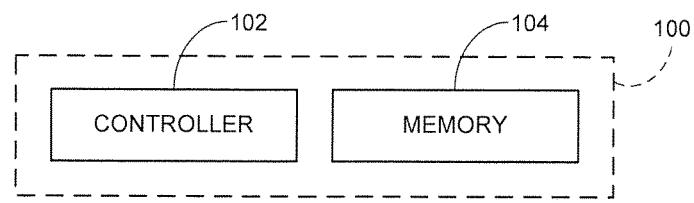
FIG. 1 is a block diagram for a data storage device characterized as a hybrid storage device in accordance with various embodiments.

The present disclosure generally relates to data storage systems, and more particularly to the management of internal data transfers in a data storage device having multiple tiers of storage such as a hybrid data storage device.

Data storage devices operate to store and retrieve computerized user data in a fast and efficient manner. Data storage devices can utilize a variety of different types of storage media, including rotatable recording discs of the type commonly used in hard disc drives (HDDs) and solid state semiconductor memory of the type commonly used in solid state drives (SSDs).

So-called hybrid data storage devices utilize two or more distinct forms of non-volatile storage media to store user data. Some forms of hybrid data storage devices (HDSDs, also sometimes referred to as solid state hybrid drives, or SSHDs) utilize a main memory formed from rotatable magnetic recording media (e.g., magnetic discs) and a smaller auxiliary memory formed from solid state (e.g., flash) memory cells. Both forms of storage media provide a combined non-volatile storage space to store user data transferred to the device from a host.

Hybrid devices are designed to combine the benefits of low cost mass storage afforded by rotatable magnetic recording media with the faster transfer rate performance provided by flash or other solid state memory. A hybrid device is often operated in such a way that high priority data are stored in solid state memory, and lower priority data are stored to the rotatable media.

Hybrid devices provide a measure of flexibility in handling host data, and can be configured to operate in a number of different ways. Some hybrid device configurations use the flash memory as a non-volatile write cache. In this way, substantially all write data received from the host are initially stored to the solid state memory, with some or all of the data being transferred to the rotatable media at a later time. In other configurations, some data such as random writes may be directed to the solid state memory, and other data such as large sequential writes bypass the solid state memory and are instead streamed directly to the rotatable media.

Archive ("cleaning") operations may be carried out to ensure that a copy of all data received by the hybrid device is ultimately stored by the rotatable media. Based on user need, high priority data stored to the rotatable media may be promoted ("pinned") by transferring a copy to the solid state memory. It follows that significant processing resources of a hybrid device may be dedicated to the internal transfer of data between the respective memories.

A technique referred to as shingled magnetic recording (SMR) can advantageously enhance the data storage capacity of the rotatable media. In SMR, tracks are written to the media in zones, with each successive track partially overlapping the previously written track in the zone.

While advantageously increasing the data storage capacity of the media surfaces, the use of SMR presents a number of challenges, particularly in a hybrid device environment. Updates to individual data blocks (such as logical block addresses, or LBAs) in an SMR zone cannot be carried out in place; rather, a substantial portion or the entirety of the zone needs to be read, updated and rewritten using a read-modify-write approach. Incorporating SMR techniques in a hybrid device can therefore offset many of the performance advantages of the high speed solid state memory, since managing the SMR data zones can consume an inordinate amount of the available system resources dedicated to the transfer of data with the host device.

Accordingly, various embodiments of the present disclosure are generally directed to a method and apparatus for managing data transfers in a multi-tiered storage device, such as a hybrid data storage device. As explained below, a hybrid data storage device may include a non-volatile solid state memory and a rotatable data recording medium.

The solid state memory may take the form of NAND flash arranged as a first set of addressable garbage collection units (GCUs), each of which is made up of a plurality of erasure blocks. The first set of GCUs are also referred to as SSD GCUs. The rotatable medium is similarly arranged as a second set of addressable GCUs, each of which is made up of a plurality of adjacent SMR zones (HDD GCUs). A control circuit directs the writing of input host data to the respective SSD and HDD GCUs using a combined map that is stored as a data structure in a local memory.

The combined map operates as a flash transition layer (FTL) that describes both flash and disc storage using a standardized format. The map correlates logical addresses of user data to physical addresses in the respective flash and HDD GCUs at which the user data are stored. The map may be a single level map or a multi-level map. In cases where copies of a particular logical data unit (addressable data block) are stored in both flash and disc, a second map can be utilized to indicate the location of the copy on the disc.

The various embodiments utilize three main operations that cooperate to provide efficient data transfers: SMR zone writing with combined (FTL) mapping, garbage collection with data compaction, and aggregation of sequential data in the SMR zones.

The SMR zone writing with FTL mapping operation helps to mitigate the occurrences of read-modify-writes and thus improves performance in many write heavy workloads. The garbage collection with data compaction operation is used to improve performance of random reads from the disc memory. The aggregation of sequential data in the SMR zones operation is used to improve performance of sequential or large reads. In this way, the data stored to the various SMR zones can be continually arranged to promote efficient write and read stream sequences.

These and other features and advantages of various embodiments can be understood beginning with a review of FIG. 1 which shows an exemplary data storage device 100. The data storage device 100 includes a controller 102 and a memory 104.

The controller 102 is a control circuit that provides top level control functionality for the storage device, and may be realized in hardware, software and/or firmware. The controller circuit may constitute one or more programmable processors having associated programming instructions stored in a memory which, when executed, cause the processor(s) to carry out various control functions as explained herein. Other forms of controller circuit can be utilized, such as hardware circuits, programmable gate arrays, logic networks, application specific integrated circuits (ASICs), system on chip (SOC) devices, etc. As will be recognized, these and other forms of controller circuits may be formed of various logic, storage and switching elements using semiconductor fabrication techniques.

The memory 104 provides non-volatile memory storage for user data transferred to the storage device by a host device. The memory may incorporate a number of different types of non-volatile memory (NVM) storage such as solid-state memory (e.g., flash), rotatable storage media, etc. For purposes of the present illustrative example, the device 100 is contemplated as comprising a hybrid data storage device (HDSD or SSHD) so that the memory 104 includes both rotatable storage media and solid state semiconductor memory.

While not limiting, the solid state memory is contemplated as erasable NAND flash memory. Other arrangements can be used such as rewritable NVM in the form of as resistive random access memory (RRAM), magnetic random access memory (MRAM), spin torque transfer random access memory (STRAM), phase change random access memory (PCRAM), etc. The rotatable data recording media also provide NVM recording capabilities in the form of one or more magnetic recording discs that utilize shingled magnetic recording (SMR) techniques. Additional techniques may be used by the rotatable medium as well including heat assisted magnetic recording (HAMR), two dimensional magnetic recording (2DMR), three dimensional magnetic recording (3DMR), perpendicular magnetic recording (PMR), bit patterned media (BPM), discrete track recording (DTR), etc.

Figure 2:
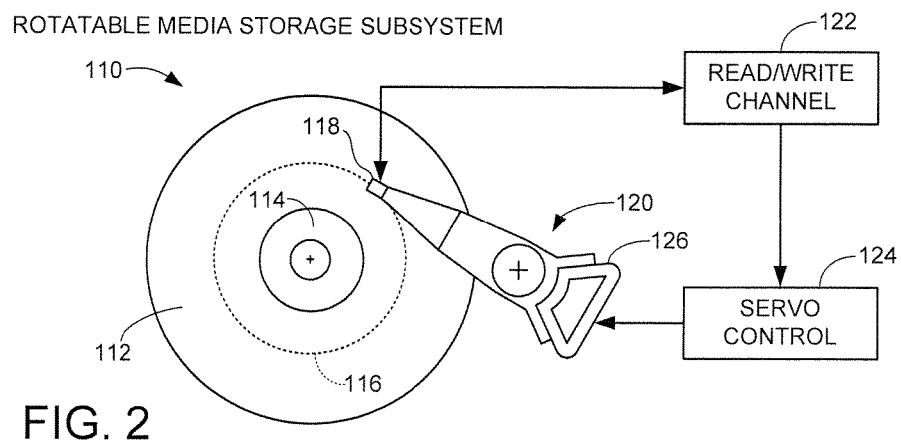
FIG. 2 is an isometric depiction of a rotatable media (HDD) storage subsystem of the hybrid storage device of FIG. 1 constructed and operated in accordance with some embodiments.

FIG. 2 shows a rotatable media storage subsystem 110 of the memory 104 of FIG. 1 in accordance with some embodiments. The subsystem 110, also sometimes variously referred to as rotatable media or the disc, constitutes aspects of a hard disc drive (HDD) storage system. Various other elements may be incorporated into the subsystem so the diagram is illustrative and not limiting.

One or more rotatable magnetic recording discs 112 are fixed for rotation about a central axis of a spindle motor 114. A number of concentric tracks 116 are arranged on each of the disc surfaces and are accessed by a data read/write transducer (head) 118.

Each head 118 is moved across the surface of the disc using a rotary actuator 120. A read/write (R/W) channel circuit 122 provides write currents to and receives transduced readback signals from each head during respective write and read operations. A servo control circuit 124 provides closed loop positional control of the position of the heads 118 using embedded servo data (not separately shown) from the disc surfaces. The servo circuit 124 applies current to a coil 126 of a voice coil motor (VCM) to adjust the position of a selected head accordingly.

Figure 3:
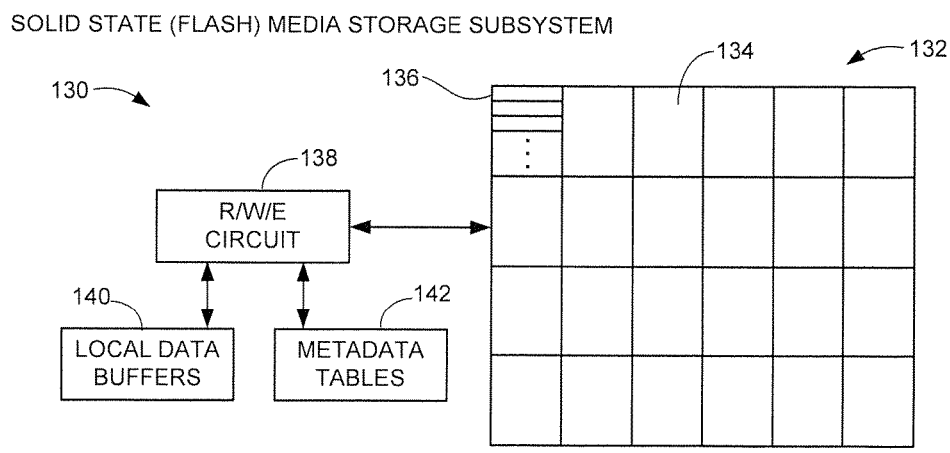
FIG. 3 is an isometric depiction of a solid state (SSD) media storage subsystem of the hybrid storage device of FIG. 1 constructed and operated in accordance with some embodiments.

FIG. 3 shows a solid state media storage subsystem 130 of the memory 104 of FIG. 1 in accordance with some embodiments. The subsystem 130 is also sometimes referred to as solid state media or the flash, and is generally arranged as aspects of a solid state drive (SSD) storage system. Various other elements may be incorporated into the subsystem so the diagram is illustrative and not limiting.

The solid state media 130 includes a flash array 132 of flash memory cells arranged into rows and columns. The flash cells are grouped into erasure blocks 134, each constituting a smallest unit of the flash array that can be erased as a unit. Each erasure block 134 is formed from individual pages (row) 136 of memory cells to which fixed sized blocks of data may be written.

A read/write/erase (R/W/E) circuit 138 forms a portion of a memory module electronics (MME) layer which directs data transfers to and from the respective pages 136, and performs data migrations and erasures during garbage collection operations. A number of local data buffers 140 in the form of volatile memory serve to temporarily buffer data during such activities. Local volatile memory 142 can further be used to load, store and utilize metadata to track the locations and revision levels of various data sets stored in the array 132.

Figure 4:
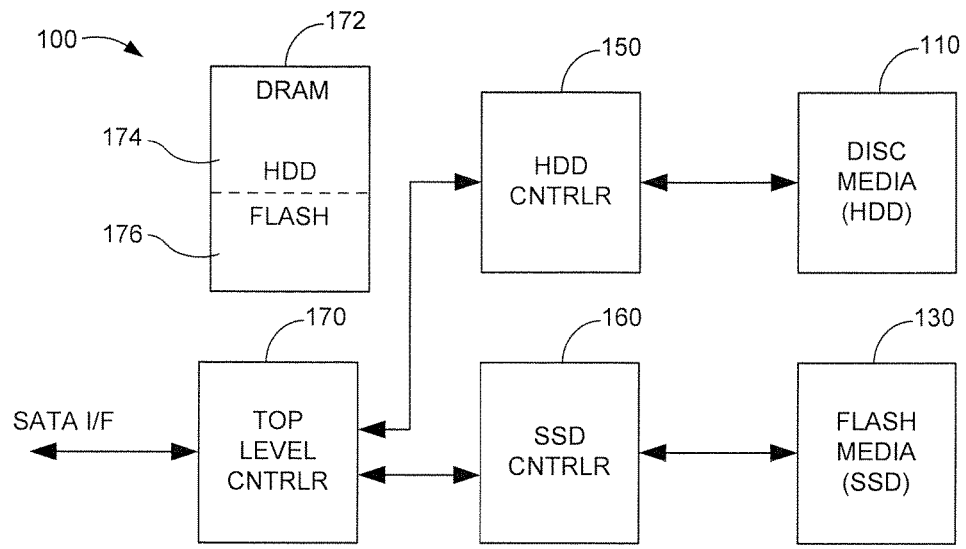
FIG. 4 shows an arrangement of the controller circuitry from FIG. 1 in accordance with some embodiments.

FIG. 4 provides a top level architecture for the device 100 in accordance with some embodiments. The disc media subsystem 110 from FIG. 2 is controlled by an HDD controller circuit 150, and the flash media subsystem 130 from FIG. 3 is controlled by an SSD controller circuit 160. Top level control of these controllers is in turn provided by a top level controller circuit 170. As mentioned above, these respective controller circuits are incorporated into the general controller 102 of FIG. 1 and may be variously realized as discussed above. It is contemplated albeit not necessarily required that these respective control circuits are physically realized as separate programmable processors or hardware processing circuits. The various circuits may be incorporated into a consolidated system on chip (SOC) integrated circuit device.

FIG. 4 further shows a local buffer memory (DRAM) 172. The DRAM is coupled to the respective controllers 150, 160 and 170 and is arranged to store user data during data transfer operations. The DRAM 172 may store other forms of data as well, including programming utilized by the various controllers, control parameters, metadata, state data, etc. The DRAM may be partitioned into separate sections, such as an HDD partition 174 for use by the HDD controller 150 and an SSD partition 176 for use by the SSD controller. Other arrangements can be used.

Figure 5:
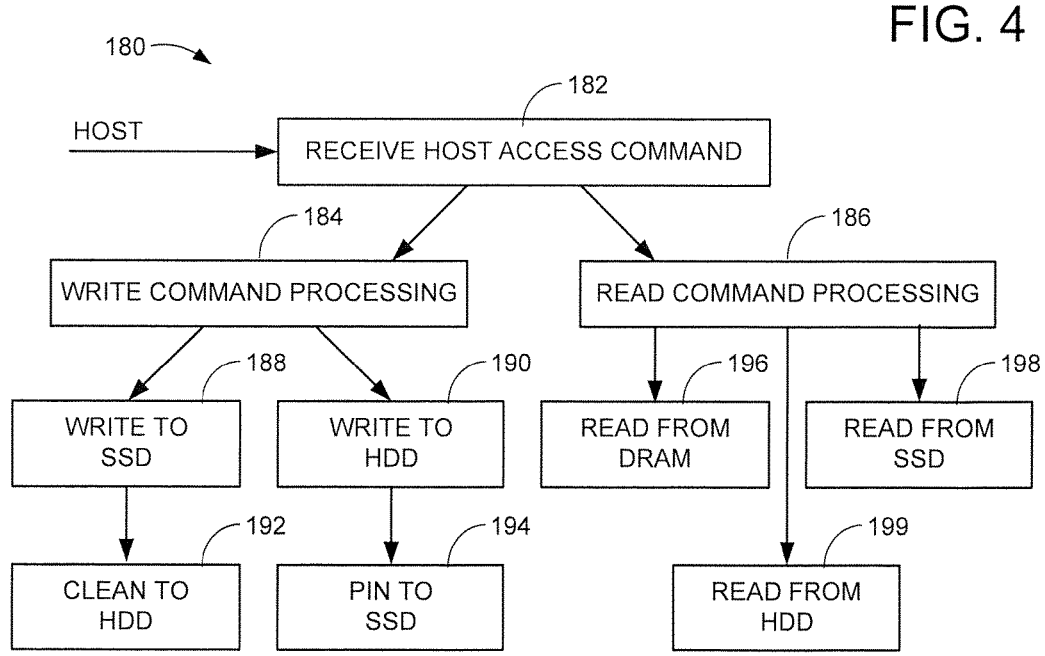
FIG. 5 illustrates a decision tree to provide an overview of various internal data transfers that take place by the storage device under the direction of the top level controller circuit of FIG. 4 in accordance with some embodiments.

FIG. 5 shows a decision tree structure 180 that can be used to illustrate decisions carried out by the top level controller 170 of FIG. 4 in managing various internal data transfers within the hybrid data storage device 100. Host access commands are received from the host device at block 182. Write commands are processed at 184, and read commands are processed at 186.

If the received command is a write command, the decision is made by the top level controller circuit to either write the data to the flash media 130 (SSD), as shown by block 188, or to write the data to the disc media 110 (HDD), block 190. The flash write commands are forwarded to the SSD controller 160 for inclusion in an SSD command queue pending execution by the associated local write circuitry (see FIG. 3). The disc write commands are similarly forwarded to the HDD controller 150 for inclusion in an HDD command queue pending execution by the associated write circuitry (see FIG. 2). Pending such transfers, the input write data are temporarily stored at an appropriate address in the DRAM 172.

Once data are written to the SSD, a cleaning operation may be subsequently scheduled, as indicated at block 192, to transfer a copy of the data to HDD. Similarly, once data are written to HDD, a pinning operation may be scheduled at block 194 to transfer a copy of the data to SSD.

Read command processing (block 186) involves reading the data from the DRAM, block 196, the SSD, block 198, or the HDD 199. It is contemplated albeit not necessarily required that the searching carried out by the top level controller circuit 170 will take place in the foregoing order. In some cases, however, the system may elect to instead search the SSD first, on the basis that it can be more efficient to satisfy read requests directly from the SSD rather than performing the additional searching for the requested data in the DRAM 172.

Figure 6:
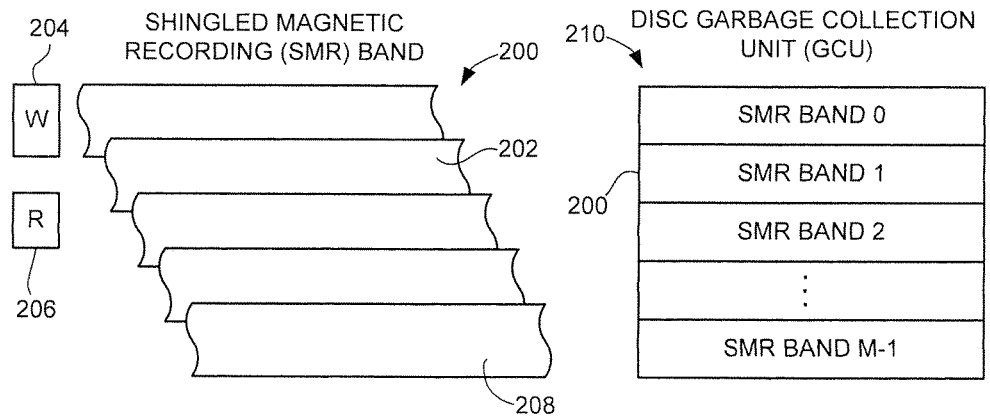
FIG. 6 illustrates the arrangement of shingled magnetic recording (SMR) tracks into zones on the rotatable (HDD) media.
Figure 7:
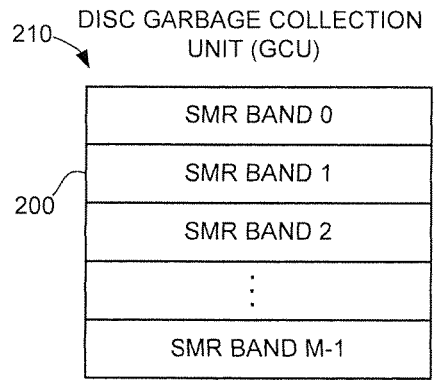
FIG. 7 shows the grouping of multiple SMR zones into a disc-based garbage collection unit (GCU).

FIGS. 6 and 7 illustrate a manner in which the data are arranged on the disc media 112. Shingled magnetic recording zones (bands) 200 are formed by partially overlapping data tracks 202 that are written in a selected sequence. Each track 202 has an initial width that nominally corresponds to the width of a writer element (W) 204 in the corresponding data transducer 118 (see FIG. 2). Each track (except for the last track in the zone, 208) is partially overwritten by a subsequent track to provide a final effective width that nominally corresponds to the width of a read sensor (R) 206 of the transducer. Each SMR zone 200 may have the same data capacity, or different SMR zones may have different data capacities as required.

A plural number M of immediately adjacent SMR zones 200 are arranged into a corresponding SMR zone group, or disc garbage collection unit (GCU) 210. The zones 200 may be immediately adjacent such that the first track 202 in each zone 200 is immediately adjacent the last track 208 in the prior zone, or one or more guard tracks may be inserted between the adjacent SRM zones. The HDD GCUs 210 are concentrically arranged on the disc surface(s) from the outermost diameter (OD) to the innermost diameter (ID). In some cases, a portion of the disc surface(s) may have HDD GCUs and other portions may have conventional (non-overlapping) tracks. Each HDD GCU may have the same data capacity, or may have a different data capacity as required. Of course, each SMR zone group 210 can also include just a single SMR zone 200. Having multiple zones in a zone group or GCU generally helps reduce resources to track and manage all the GCUs.

Figure 8:
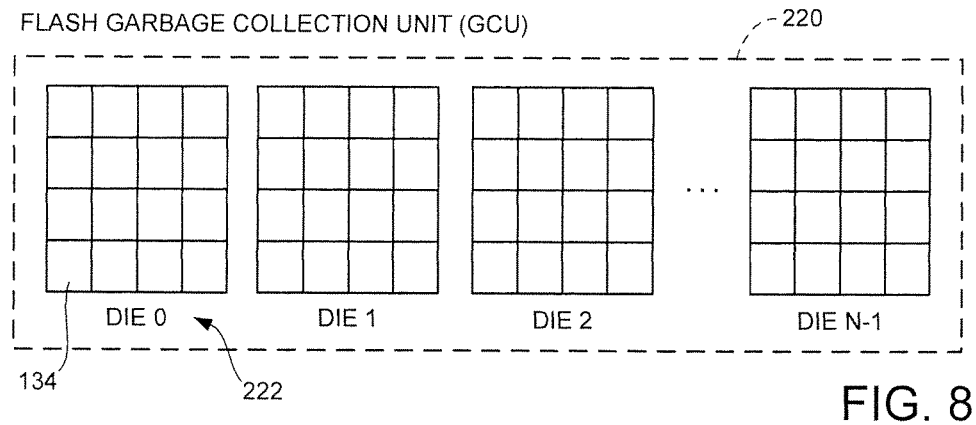
FIG. 8 illustrates the grouping of multiple sets of erasure blocks from different dies into a SSD GCU in the solid state (SSD) memory.

FIG. 8 shows an arrangement of a SSD GCU 220 to illustrate an arrangement of the flash memory 132. The MME layer may accommodate multiple lanes or channels of data transfer to each of a plurality of dies 222, and the SSD GCU 220 is formed of a selected number of corresponding erasure blocks 134 on each of a plural number N dies. Other arrangements can be used. As before, each of the SSD GCUs 220 can have the same data capacity or different capacities.

Figure 9:
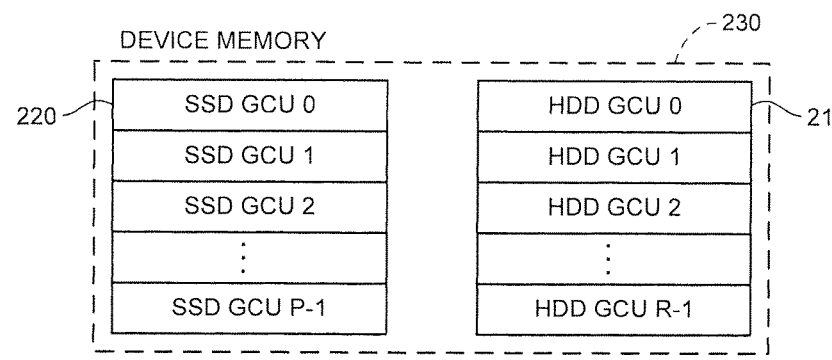
FIG. 9 shows the available disc and SSD GCUs in the storage device.

FIG. 9 represents a combined memory space 230 of the hybrid device 104 made up of a plural number P SSD GCUs 220 and a plural number R HDD GCUs 210. The SSD GCUs 220 can be configured to nominally be the same size as the HDD GCUs 210. Because of the difference in relative memory capacities, however, it is contemplated that there will be many more HDD GCUs 210 in the memory space 230 as compared to the number of SSD GCUs 220.

Figure 10:
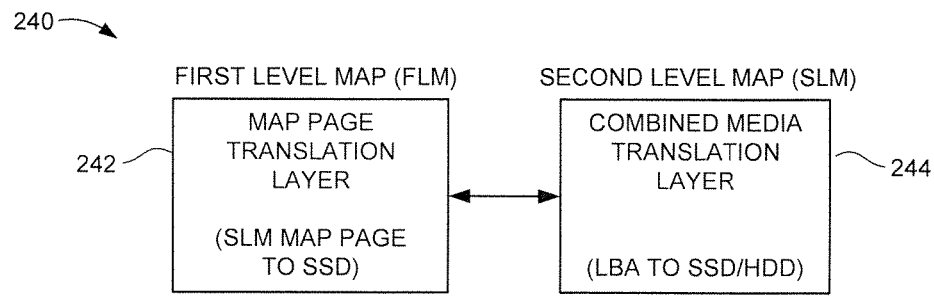
FIG. 10 represents a multi-level map used to track the locations of data in the memory arrangement of FIG. 9.

The memory space 230 is managed using a map structure 240 represented in FIG. 10. The map structure 240 is shown as a multi-level map, although such is merely exemplary and is not limiting as a single level or additional levels can be used. The map 240 includes a first level map (FLM) 242 and a second level map (SLM) 244.

The FLM 242 is referred to as a map page translation layer which provides the locations of the various SLM map pages stored in flash (SSD). The SLM 244, also sometimes referred to as a combined flash transition layer (FTL) or a combined media translation layer (CMTL), provides logical address (LBA) to storage locations of the various logical block units stored in NAND flash (SSD) and disc (HDD).

The SLM 244 generally operates as a conventional FTL to map logical data units to the NAND locations of the SSD, but is extended such that the SLM also maps all logical data units of the entire memory space 230. For each logical data unit, the SLM maps to a NAND flash location or HDD media location. In some embodiments, the FTL can map a logical data unit to both a location in NAND and HDD media location such as when the SSD is used as a cache to the HDD.

The SMR zones 230 in the HDD are managed in a similar way to how NAND blocks are managed in the SSD. Each of the SMR zones 230 starts as free or empty zone. In some embodiments, one SMR zone is selected for new data to be written. Logical data units are written sequentially into the SMR zone until the zone is filled. As the LBA (logical block address) of the associated logical data unit may be random, the SLM 244 is updated to map the LBA to the HDD media location. As noted above, multiple adjacent SMR zones may be grouped together to form SMR groups (HDD GCUs 210), in which case the management and writes are performed on the SMR groups rather than individual SMR zones as each zone can be relatively small.

Figure 11:
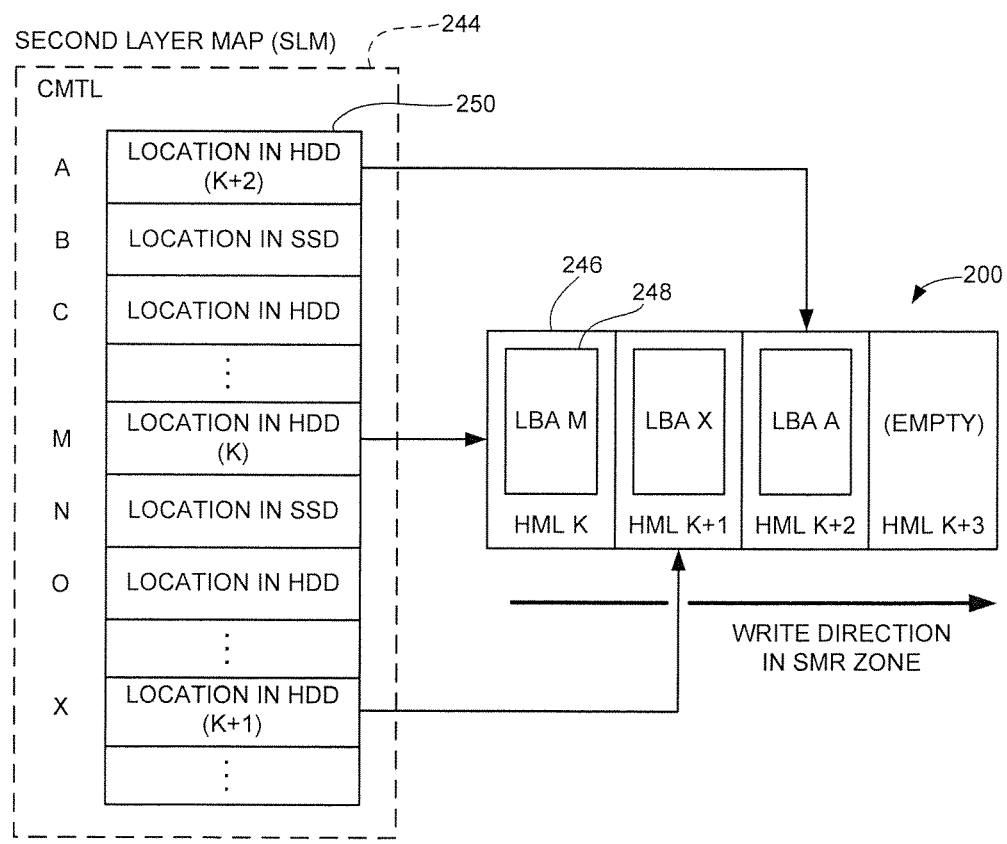
FIG. 11 illustrates use of the second level map (SLM) of FIG. 10 in locating data written to the HDD media section.

FIG. 11 depicts portions of the SLM 244 in conjunction with a portion of a selected SMR zone 200. Physical locations adapted to store logical block units along the SMR zone 200 are denoted at 246, and the actual data contents (identified via LBA) written to the locations 246 are denoted by blocks 248.

The SLM 244 includes a number of entries 250 that map to the data capacity of the system by LBA. It can be seen in FIG. 11 that logical data units (LBA=N,X,A) are written to the SMR zone 200 in that order and occupy the HDD media locations (HML=K, K+1, K+2). The SLM 244 is also updated and maps the corresponding logical data units to their location in the HDD. The figure shows a single logical data unit 248 occupies a single HDD media location 246. In other embodiments, one or more logical data units can occupy a single HDD media location.

In this scheme, the HDD media locations are written in order in a physical sequence within a zone even for non-sequential LBAs (e.g., random, non-sequential logical addresses), and the SLM maps the logical data units to the corresponding locations. Small random writes to the HDD are eliminated and writes to the HDD occur when writing sequentially to a zone. To the SMR HDD, writes are always sequential within a zone and there are no partial updates to a zone and thus read-modify-write of a zone is also eliminated.

As data blocks are continuously written to the HDD, all the zones 200 will be written with data. But as the same LBA may be written more than once, only the most recently written data for a given LBA is valid while the older writes of the same LBA are stale. A given zone 200 may have some amount of valid data and some amount of stale data. Similar to SSD management of NAND blocks, in order to re-use an SMR zone, garbage collection is performed on the zone first. To perform garbage collection of a zone, the valid LBAs in the zone are determined and then the data of LBAs are re-written and remapped to a new zone.

Figure 12:
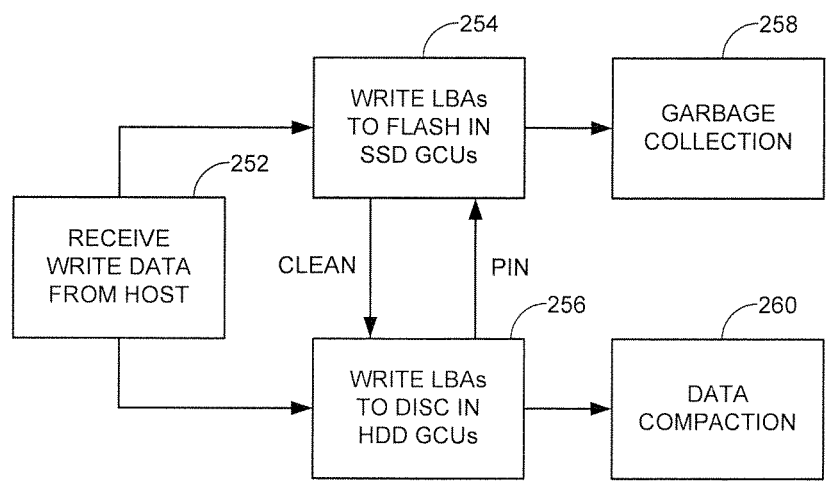
FIG. 12 is a process flow diagram illustrating various actions taken by the device in some embodiments.

FIG. 12 shows a process sequence of data writes to the respective SSD and HDD GCUs. Write commands and associated write data are received and processed at block 252. Writes to SSD are carried out at block 254, and writes to HDD are carried out at block 256. Cleaning and pinning transfers occur as required between these respective locations.

Because the SSD GCUs utilize erasable NAND flash memory, a garbage collection operation is carried out from time to time, as indicated by block 258 to clear stale data and return the SSD GCUs to service. A garbage collection operation on the NAND flash memory includes identifying all copies of the SSD GCU 220 that is still current, copying the current data to a new location (such as a different, currently allocated GCU), erasing the erasure blocks in the SSD GCU, and then returning the SSD GCU to an allocation pool pending subsequent allocation for the storage of new data.

The HDD GCUs 210 are generally treated in a similar manner, in that an analogous garbage collection operation is carried out to reclaim/reorganize the disc GCUs. In an HDD GCU, each SMR zone 200 covers a number of consecutive tracks (or physically closely grouped tracks) on the media, and may be thought of as a disc based erasure block, since write updates are not easily carried out unless the entire contents are read out and rewritten, which is largely avoided in the current scheme.

From the perspective of the disk media, the SMR zones 200 divide the media from the OD to the ID of the disc(s). Unlike flash media, the physical location where data sets are stored on the SMR HDD media can greatly affect performance. Accordingly, block 260 shows a data compaction operation that is carried out to garbage collect the HDD GCUs 210. During data compaction, valid data (and available space) is reclaimed and the data are generally migrated toward the OD.

Due to the nature of an HDD design, the SMR zone 200 at the OD has the highest data transfer rate, and the transfer rates generally decrease toward the ID of the media. This can translate into better performance especially for sequential reads and writes. When selecting an SMR zone 200 for writing new data, zones in the direction toward the OD are prioritized.

From a practical standpoint, a storage device in real life usage is not typically written with data to the full capacity of the device. Depending on the type of workload, the device may be filled to only 50% of capacity. In this case, only half or less of the SMR zones are needed to store all the host data. As discussed above, data are written to the various SMR zones 200 until all or most of the zones are written with data. Even though say only 50% of the storage capacity is filled, the written data can spread across all of the SMR zones, meaning 50% or more of the data in the various SMR zones are actually invalid (stale), with newer versions of the LBAs having been written later. Because the HDD is a mechanical device, accessing data across zones requires physical movements of the actuator 120 (FIG. 2) and the farther apart of the data on the media, the longer the access time required to return a data set.

Performance can be improved by reducing the physical distances between data blocks on the media, which is carried out during the data compaction operation of block 260. The data compaction operation may be performed as a background process to move and store data together in the best available performing HDD GCUs 210. Valid data blocks are read from one zone and rewritten and remapped to a new location in a new zone. An initial set of blocks in a disc GCU may cover a first radial extent of the disc, and after the data compaction operation this radial extent may be reduced significantly, enabling more efficient data accesses.

In some embodiments, the SMR zone selection for the source zone is based on zone location relative to the OD/ID of the disc 112 and also the amount of valid data within the zone. The destination zone is selected based on its location relative to OD/ID. In other embodiments, the zones are selected based on data densities on the media.

Figures 13A, 13B:
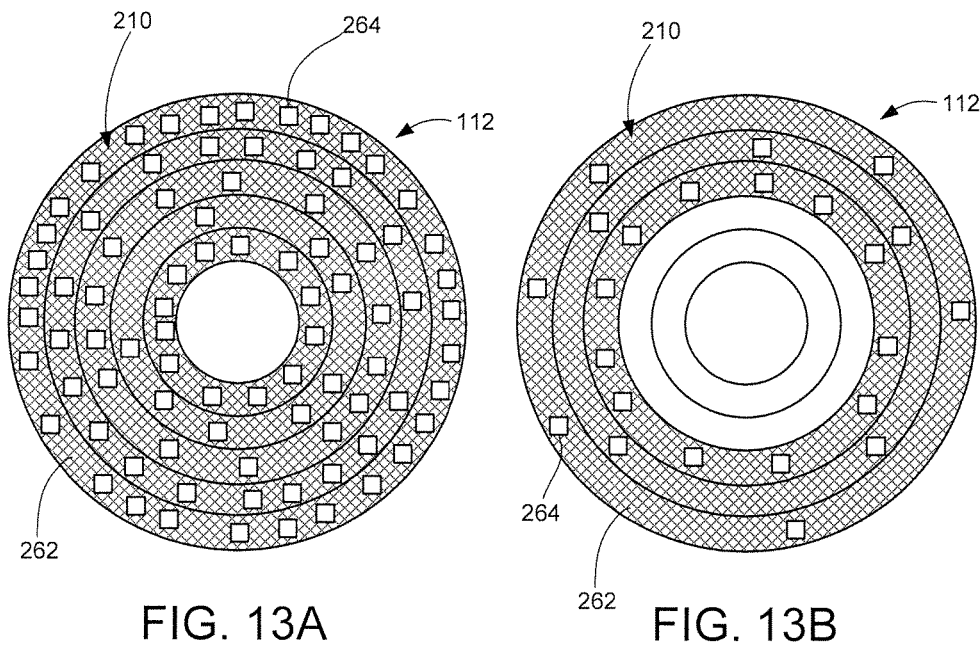
FIGS. 13A and 13B illustrate the data compaction operation of FIG. 12.

FIGS. 13A and 13B show an example disc 112 of the hybrid storage device 104 both before and after a data compaction operation. A total of five (5) concentric and adjacent HDD GCUs 210 are shown, although it will be appreciated that this has been exaggerated for clarity as a typical media surface may accommodate many tens, hundreds or thousands of zones/GCUs or more as required. The cross-hatched regions 262 of each of the HDD GCUs 210 represent current version data. The white squares 264 represent either available space or invalid (stale) data sets.

As can be seen from a comparison between FIGS. 13A and 13B, the density of current data is improved in the outermost zones as a result of the data compaction operation. A few sparse squares 264 remain in the filled GCUs 210 to represent stale data due to new writes after the compaction and/or accommodate new data writes in these regions.

In some cases, garbage collection at the SSD level (block 258 in FIG. 12) is coordinated by the controller with data compaction at the HDD level (block 260 in FIG. 12) so that appropriate sets of current data can be transferred, as required, between the respective memories and written to appropriate locations.

Once compacted, the HDD stage 110 will continue to store user data as required. For small or random writes, updates may be directed to be within an existing HDD GCU 210 to limit the stroke distance of the actuator 132 during read operations. In this way, all versions of a given LBA may be limited to being stored within a given HDD GCU to reduce latency times during reads. The maximum radial size of the HDD GCUs may be established to ensure a minimum data transfer rate can be obtained for the non-sequentially written data sets. In some cases, individual or small sets of LBAs may be stored in the SSD stage 130 if the LBAs cannot be accommodated in a location on the media within the required latency times, and such condition can be used to trigger a new data compaction operation at the disc level.

Steps carried out during the data compaction operation may include selecting a particular HDD GCU 210 for processing, reading the contents into a local buffer, jettisoning the invalid (stale) copies of data, rewriting the current version data back to the media in one or more adjacent SMR zones 200, and updating the CMTL map structure with the new locations of the data. It is contemplated that the status information (including forward pointers to the most current data) will be determined from the map structure, as with NAND flash management techniques.

Large writes to the storage device occur frequently especially with certain applications. Large writes are writes to multiple consecutive LBAs. When a host subsequently accesses related data, the same set of LBAs may also be requested. The data stored in the in SMR zones 200 can get fragmented where a given set of consecutive LBAs are not stored together, but rather are stored in different SMR zones.

The various embodiments prioritize data for consecutive LBAs to be written within a SMR Zone so large reads are serviced efficiently. First, when data blocks are moved from the SSD to the HDD, large consecutive LBAs are moved together. Second, during garbage collection and data compaction of the respective SMR zones, consecutive portions of data are re-written together. Third, if there are gaps in the LBA sequence where one or more of the LBAs are found to be stored in a different location on the HDD, those LBAs can be read to fill the gaps such that the consecutive LBAs are together in the write or re-write operation.

Figure 14:
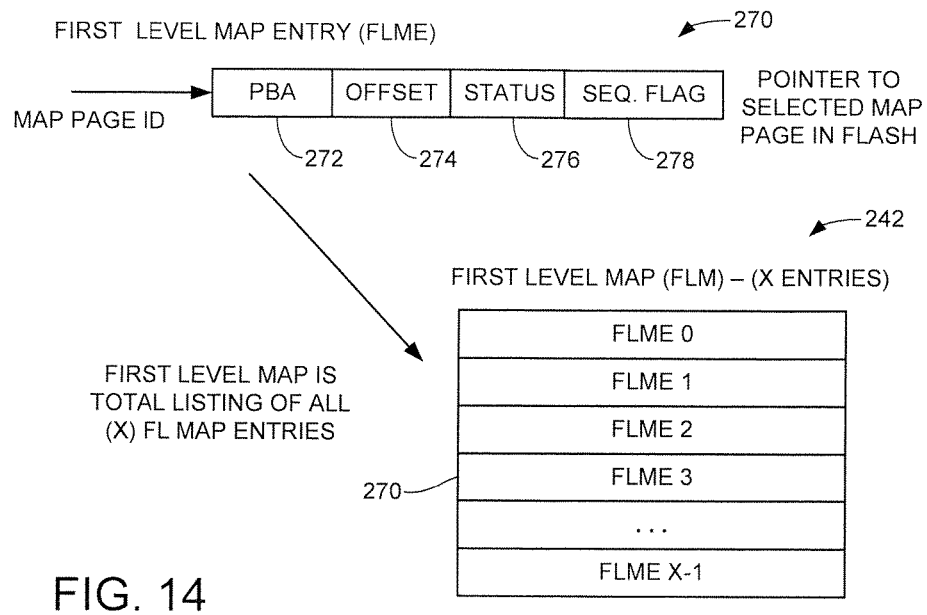
FIG. 14 is an exemplary arrangement of the first level map (FLM) of FIG. 10.

In some cases, the map structure 240 (FIG. 10) can be further adapted to indicate whether certain data blocks are associated with large writes. FIG. 14 shows aspects of the FLM 242, which as noted above can be used to provide mapping of the second level map (SLM) pages stored in the NAND flash. FIG. 14 shows the FLM 242 can be formed as a number of entries 270 which are indexed by a map page ID value. Each entry 270 is a pointer to the corresponding map page stored in flash, and may include various fields such as a physical block address (PBA) field 272, an offset field 274, a status field 276, and a sequential data flag field 278. Other formats can be used.

The PBA value provides a physical address in the NAND flash (e.g., array, plane, die, GCU, erasure block, page, etc.). The offset value may be a bit value offset for the associated data within a given page. The status field can provide various information regarding the data including version, pointers, etc. The sequential data flag identifies if large numbers of logical data units within the SLM should be placed together. This extra information can be in the form of a flag bit. This flag bit can be set when certain conditions are met such as, but not limited to, large writes that are detected as part of a given SLM page, or host provided hints where certain logical data units are accessed together. The hints can be in the form of special commands such as 'stream' commands issued by the host or other source.

The flag bit in the FLM 270 allows the device to ensure the logical data units as part of the SLM page are always written together in the same SMR zone 200 when moving the logical data units from SSD to HDD, HDD to SSD, or during garbage collection and data compaction from one SMR zone to another.

Figure 15:
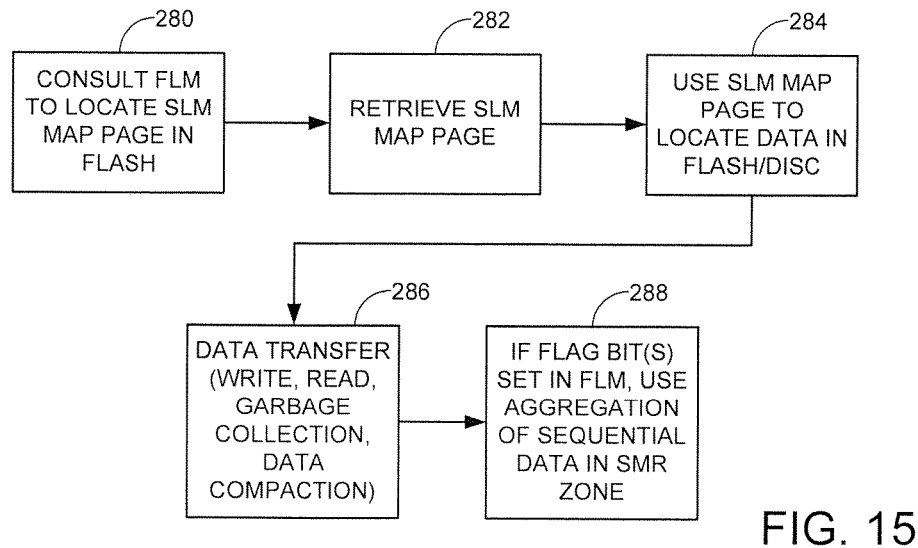
FIG. 15 is a process flow diagram illustrating various actions taken by the device including the aggregation of sequential data in accordance with some embodiments.

FIG. 15 shows a process flow for various steps carried out using the multi-level map structure 240 from FIG. 10 during normal operation of the hybrid device 100. To service a given data transfer operation, the FLM 242 is initially consulted to locate the corresponding SLM map page stored in the NAND flash 132, as indicated at block 280. The associated SLM map page is retrieved at block 282, and used to locate the corresponding logical block units (at the associated LBAs) in either the HDD or SSD at block 284.

Once the data have been located, various data transfer operations may be carried out as discussed above (e.g., writes, reads, garbage collection, compaction) as indicated by block 286. Should the flag bit or bits from field 278 be set, data aggregation is carried out to group sequential data into groups that are then written to one or more adjacent SMR zones 200, block 288. It will be noted that such aggregation can be carried out at any suitable time, such as part of a data streaming, cleaning, pinning and/or compaction operation.

Figure 16:
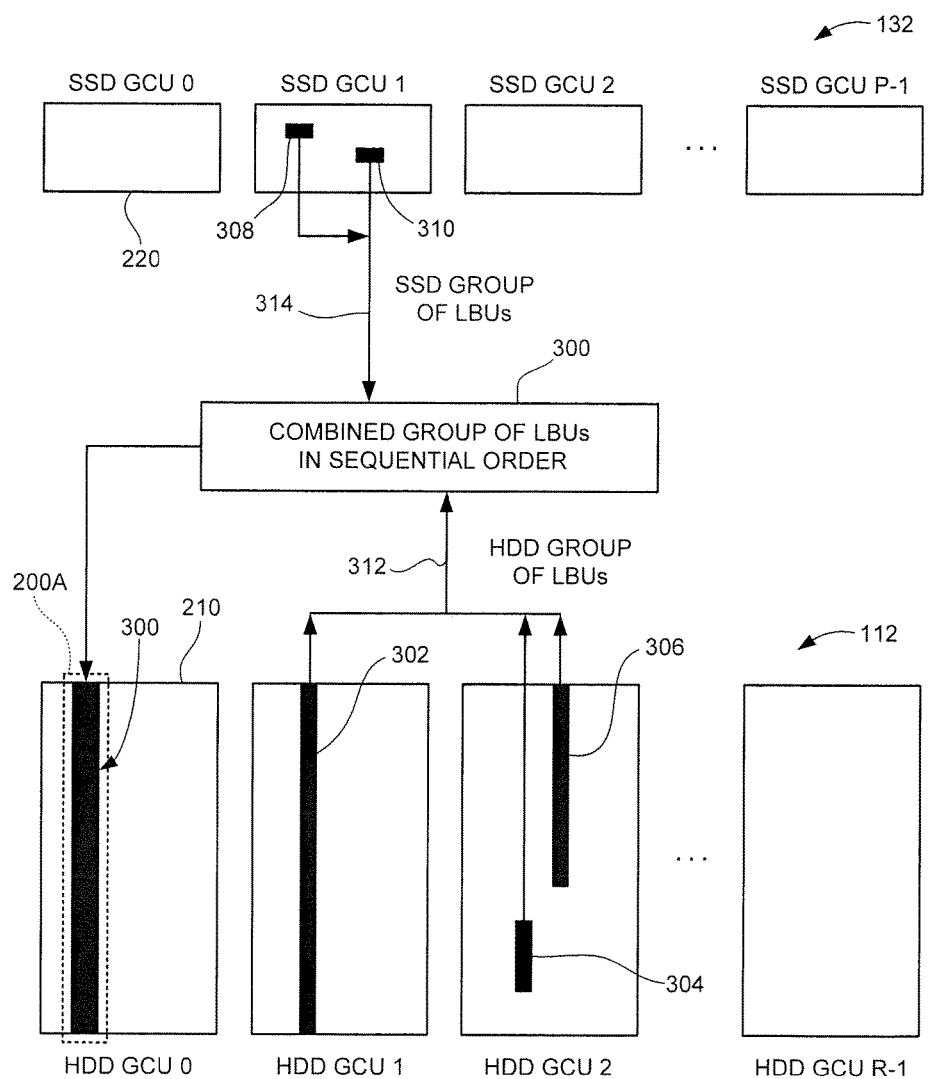
FIG. 16 is a functional block representation of a data compaction and aggregation operation carried out in accordance with some embodiments.

FIG. 16 is a functional block diagram to illustrate these various operations in accordance with the foregoing discussion. The respective SSD GCUs 0 to P-1 220 and the HDD GCUs 0 to R-1 110 from FIG. 9 are shown. At the commencement of a data compaction and aggregation operation, various logical block units (LBUs) are retrieved from the respective SSD and HDD portions of the device to form a combined group of LBUs 300 that are arranged in sequential order via logical address (e.g., sequential LBA order).

From FIG. 16 it can be seen that an initial set of the LBUs were written to HDD GCU 1, as indicated at 302. Additional updates or adjacent LBUs were written at 304, 306 in HDD GCU 2, and further updates or adjacent LBUs were written to SSD GCU 1 at 308, 310. The LBUs 302, 304 and 306 thus form an HDD group of LBUs 312, and the LBUs 308, 310 make up an SSD group of LBUs 314 that are inserted into and among the HDD group. The combined map structure 240 enables LBUs stored anywhere in the combined memory 230 (FIG. 9) to be identified and combined as desired. In some cases, a majority of the LBUs can be supplied by the SSD section rather from the HDD section as shown.

Once the combined group 300 is arranged in local memory (such as the DRAM 172, FIG. 4), the data are streamed to a selected SMR zone 200A in HDD GCU 0. Depending on the configuration of the HDD section, the various SMR zones can be written and overwritten as desired to accommodate as many shingled tracks as required to accommodate the total size of the combined group 300. As magnetic media normally do not require an erasure operation, the new SMR zone 200A can be overwritten onto existing data, provided the existing data have previously been marked stale and/or current data from that location saved in memory (including temporarily in the SSD section).

It follows that the various embodiments disclosed herein provide various techniques to enhance data transfers in a hybrid storage device that employ SMR techniques. The SMR zone writing generally involves writing updated logical data units to the same HDD GCU. This limits the maximum radial distance or spread for a given sequential LBA data set to a predetermined level to enhance read recovery. Read-modify-writes are largely avoided; instead, new updated data sets are rewritten to a new SMR zone within a given one of the HDD GCUs. Alternatively, individual or small numbers of updated logical data units may be retained in flash rather than being written to disc.

Garbage collection operations are carried out in both flash and HDD GCUs, with the garbage collection on the rotatable medium involving a data compaction operation to migrate data to the GCUs nearer the outermost diameter (OD) of the medium.

The aggregation of sequential data involves identifying large sets of logical data units with consecutive logical addresses and writing such to the various SMR zones. A special flag value can be incorporated into the combined map that is set by the control circuit, such as in the case of large sequential writes or host provided hints where certain logical data units are accessed together. These respective techniques can be used individually or combined as required. System statistics can be monitored to enable adaptive adjustments to various parameters to achieve desired system performance levels, such as overall data transfer rates, command completion times, etc.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A hybrid data storage device comprising:
a first non-volatile memory (NVM) comprising solid state memory cells arranged into a first set of garbage collection units (GCUs) each comprising a plurality of erasure blocks that are allocated and erased as a unit;
a second NVM comprising a rotatable data recording medium arranged into a second set of GCUs each comprising a plurality of shingled magnetic recording tracks that are allocated and erased as a unit;
a control circuit configured to combine a first group of logical block units (LBUs) stored in the first set of GCUs with a second group of LBUs stored in the second set of GCUs to form a combined group of LBUs arranged in sequential order by logical address, and to write the combined group of LBUs to a zone of shingled magnetic recording tracks in a selected one of the second set of GCUs; and
a map stored as a data structure in a memory that correlates logical addresses of the LBUs to physical addresses in the respective first and second sets of GCUs at which the LBUs are stored, the map comprising at least one flag value that signifies at least a selected one of the first or second groups of LBUs were initially written as part of a sequential write operation, the control circuit selecting the at least a selected one of the first or second groups of LBUs for inclusion in the combined group of LBUs responsive to the at least one flag value.

2. The apparatus of claim 1, wherein the first group of LBUs comprise initial version data blocks written to the first NVM responsive to a first write command received from a host device, and wherein the second group of LBUs comprise updated version data blocks written to the second NVM responsive to at least a subsequent second write command received from the host device, the updated version data blocks replacing at least a portion of the initial version data blocks in the combined group of LBUs.

3. The apparatus of claim 1, wherein the second set of GCUs are arranged concentrically from a position adjacent an outermost diameter (OD) toward an innermost diameter (ID) of the medium, and wherein the combined group of LBUs is written at a position closer to the OD than the second group of LBUs.

4. The apparatus of claim 1, wherein the zone of shingled magnetic recording tracks to which the combined group of LBUs is written are formed by overwriting at least one previous zone of shingled magnetic recording tracks.

5. The apparatus of claim 1, wherein each of the second set of GCUs is formed from a plurality of immediately adjacent zones of shingled magnetic recording tracks.

6. The apparatus of claim 1, wherein the control circuit is further configured to perform a garbage collection operation upon the first set of GCUs to erase and reallocate the first set of GCUs for use in receiving new LBUs, wherein current version LBUs identified during the garbage collection operation are relocated to a new storage location prior to said erasure and reallocation.

7. The apparatus of claim 6, wherein the new storage location is a different one of the first set of GCUs.

8. The apparatus of claim 6, wherein the new storage location is the zone of shingled magnetic recording tracks to which the combined group of LBUs is written.

9. The apparatus of claim 1, further comprising a map stored as a data structure in a memory that correlates logical addresses of the LBUs to physical addresses in the respective first and second sets of GCUs at which the LBUs are stored, the map arranged as a combined media transition layer that uses a common format to identify physical addresses in both the first NVM and the second NVM.

10. The apparatus of claim 1, wherein the first NVM comprises a NAND flash memory array and the second NVM comprises at least one magnetic recording disc.

11. A hybrid data storage device comprising:
a NAND flash memory array adapted to store logical block units (LBUs) of user data supplied by a host device in erasure blocks, the erasure blocks arranged into a first set of garbage collection units (GCUs) each configured to be allocated and garbage collected as a unit;
a rotatable magnetic recording medium adapted to store LBUs of user data supplied by the host device in concentric data tracks, the data tracks configured as a plurality of adjacent zones of shingled magnetic recording (SMR) tracks which in turn are arranged into a second set of GCUs each configured to be allocated and garbage collected as a unit, each zone of SMR tracks comprising a succession of tracks where each successively written track partially overlaps a previously written track in the zone;
a map stored as a data structure in a memory that correlates logical addresses of the LBUs to physical addresses in the respective first and second sets of GCUs at which the LBUs are stored, the map arranged as a combined media transition layer that uses a common format to identify physical addresses in both the NAND flash memory array and the rotatable magnetic recording medium; and
a control circuit adapted to use the map to assemble and stream a group of LBUs to a selected zone of SMR tracks in a selected one of the second set of GCUs responsive to a flag bit value in the map, the flag bit value set responsive to a stream command from the host device.

12. The apparatus of claim 11, wherein the group of LBUs streamed by the control circuit is formed from a first group of LBUs stored in the first set of GCUs and a second group of LBUs stored in the second set of GCUs.

13. The apparatus of claim 11, wherein the control circuit is further adapted to compact the data stored in the second set of GCUs in a direction toward an outermost diameter (OD) of the rotatable magnetic recording medium.

14. A method comprising:
programming a first set of logical block units (LBUs) to a first non-volatile memory (NVM) comprising solid state memory cells arranged into a first set of garbage collection units (GCUs) each comprising a plurality of erasure blocks that are allocated and garbage collected as a unit;
writing a second set of LBUs to a second NVM comprising a rotatable data recording medium arranged into a second set of GCUs each comprising a plurality of shingled magnetic recording tracks that are allocated and garbage collected as a unit, the second set of LBUs comprising logically sequential data blocks written to the second NVM and the first set of LBUs comprising new version data blocks that supersede old version data blocks in the second set of LBUs;
generating a map as a data structure stored in a memory that correlates logical addresses of the first set of LBUs to physical addresses in the first NVM and logical addresses of the second set of LBUs to physical addresses in the second NVM, the map arranged as a combined media transition layer that uses a common format to identify physical addresses in both the first NVM and the second NVM;
setting at least one flag value in the map responsive to a sequential write operation from a host device, the at least one flag value identifying the sequential write operation as comprising receipt of a stream command from the host device;
combining a first group of the first set of LBUs and a second group of the second set of LBUs to form a combined group of LBUs in which the new version data blocks from the first set of LBUs replace the old version data blocks in the second set of LBUs, the combined group of LBUs formed responsive to the at least one flag value; and
streaming the combined group of LBUs to a zone of shingled magnetic recording tracks in a selected one of the second set of GCUs.

15. The method of claim 14, wherein the first group of LBUs comprise initial version data blocks written to the first NVM responsive to a first write command received from a host device, and wherein the second group of LBUs comprise updated version data blocks written to the second NVM responsive to at least a subsequent second write command received from the host device, the updated version data blocks replacing at least a portion of the initial version data blocks in the combined group of LBUs.

16. The method of claim 14, further comprising arranging the second set of GCUs to extend across a first radial extent of the medium, and wherein the combined group of LBUs is written to extend across a smaller, second radial extent of the medium.

17. The method of claim 14, wherein the zone of shingled magnetic recording tracks to which the combined group of LBUs is written is formed by overwriting at least one previous zone of shingled magnetic recording tracks.

18. The method of claim 14, wherein each of the second set of GCUs is formed from a plurality of immediately adjacent zones of shingled magnetic recording tracks.

19. The method of claim 14, further comprising:
performing a garbage collection operation upon the first set of GCUs to erase and reallocate the first set of GCUs for use in receiving new LBUs; and
writing current version LBUs identified during the garbage collection operation to the zone of shingled magnetic recording tracks to which the combined group of LBUs is written.

20. The method of claim 14, wherein each of the new version data blocks in the first set of LBUs shares a host logical address with a corresponding one of the old version data blocks in the second set of LBUs.

* * * * *